United States Patent
Baur et al.

(10) Patent No.: US 7,678,021 B2
(45) Date of Patent: Mar. 16, 2010

(54) METHOD AND DEVICE FOR CONTROLLING AN INTERNAL-COMBUSTION ENGINE BEFORE A STARTING OPERATION

(75) Inventors: Peter Baur, Moensheim (DE); Moritz Martiny, Karlsruhe (DE); Thomas Gruenter, Steinheim-Höpfigheim (DE); Andreas Bader, Neuhausen (DE); Holger Ackermann, Mühlacker (DE); Jan-Peter Hoffmeister, Leonberg (DE); Jochen Möckl, Knittlingen-Freudenstein (DE)

(73) Assignee: Dr. Ing. h.c. F. Porsche AG, Stuttgart (DE)

( * ) Notice: Subject to any disclaimer, the term of this patent is extended or adjusted under 35 U.S.C. 154(b) by 531 days.

(21) Appl. No.: 11/447,879

(22) Filed: Jun. 7, 2006

(65) Prior Publication Data

US 2006/0293150 A1    Dec. 28, 2006

(30) Foreign Application Priority Data

Jun. 7, 2005    (DE) .................. 10 2005 026 066

(51) Int. Cl.
*B60W 10/04*    (2006.01)
(52) U.S. Cl. ..................................... 477/183
(58) Field of Classification Search .............. 477/183, 477/185, 186, 187, 102; 701/110
See application file for complete search history.

(56) References Cited

U.S. PATENT DOCUMENTS

| | | | | |
|---|---|---|---|---|
| 4,873,891 A | * | 10/1989 | Guanciale | 74/625 |
| 5,479,898 A | * | 1/1996 | Cullen et al. | 123/350 |
| 6,543,414 B2 | * | 4/2003 | O'Neil et al. | 123/350 |
| 6,770,009 B2 | * | 8/2004 | Badillo et al. | 477/102 |
| 7,025,039 B2 | * | 4/2006 | Bidner et al. | 123/339.11 |
| 2004/0055561 A1 | * | 3/2004 | Wagner et al. | 123/299 |

FOREIGN PATENT DOCUMENTS

| | | |
|---|---|---|
| DE | 3037211 A1 | 4/1982 |
| DE | 198 06 665 A1 | 8/1999 |
| DE | 100 24 704 A1 | 11/2001 |
| DE | 10156940 A1 | 5/2003 |
| EP | 0890716 A2 | 1/1999 |

OTHER PUBLICATIONS

European Search Report dated Jul. 31, 2009.

* cited by examiner

*Primary Examiner*—Roger L Pang
*Assistant Examiner*—Erin D Bishop

(57) ABSTRACT

A method and device are provided for limiting, in a first operating condition, a motor vehicle internal-combustion engine torque. The operating condition, resulting from an operation of a motor vehicle brake, when the engine torque is simultaneously demanded by a driver's intention indicator, differs from a second operating condition, in which the brake is not operated. The limiting takes place at least partially by way of a controlled reduction of an advance angle efficiency in the first operating condition in comparison to the second operating condition.

15 Claims, 4 Drawing Sheets

METHOD AND DEVICE FOR CONTROLLING AN INTERNAL-COMBUSTION ENGINE BEFORE A STARTING OPERATION

BACKGROUND AND SUMMARY OF THE INVENTION

This application claims the priority of German Application No. 10 2005 026 066.7 filed Jun. 7, 2005, the disclosure of which is expressly incorporated by reference herein.

The present invention relates to a method of limiting, in a first operating condition, a torque provided by a motor vehicle internal-combustion engine, in which the first operating condition, as a result of an operation of a motor vehicle brake, when a torque of the internal-combustion engine is simultaneously demanded by a driver's intention indicator, differs from a second operating condition when the brake is not operated. The present invention also relates to a control device of a motor vehicle internal-combustion engine which, in such an operating condition, limits the torque from the internal-combustion engine, and to a computer program and a control device storage medium.

For achieving maximum acceleration when the vehicle is started from a stopped condition, its transmission line may be distorted by a simultaneously occurring demand of a high torque by way of the driver's intention indicator and a holding of the motor vehicle by operating the brake. Torque therefore does not first have to be built up during a start but already built-up torque is first compensated by the braking intervention and, when the brake is released, can accelerate the motor vehicle without any delay.

It is understood that such a distortion, which is also called "stalling", in principle, has a wear-promoting effect. Thus, the torque which was possibly applied at a high rotational speed with a full-load of the internal-combustion engine, during the stalling, has to be dissipated by frictional work between the tires and the road or in the drive train itself. The frictional heat released in this process is a result of the product of the power generated by the internal-combustion engine, which may be in the three-digit kilowatt range, and of the time. In the case of stalled driving wheels, only frictional connections of the drive train, thus, particularly a wet clutch or a dry clutch or a hydraulic torque converter, can be used for converting the engine power to frictional heat.

These observations indicate the necessity of protecting these components from unacceptably high mechanical and thermal stress during the stalling by limiting the power of the internal-combustion engine which can take place by limiting its rotational speed and/or its torque.

In this context, it is customary to limit the torque by a limitation of the charging of combustion chambers of the internal-combustion with air or air-fuel mixture. In the case of motor vehicles with an electronically operated throttle valve (e-gas), this normally takes place by taking back, or decreasing, the throttle valve opening angle. As a result, however, the reaction time of the motor vehicle, or of the drive train also increases after a releasing of the brake and a resulting opening of the throttle valve. This is caused by, among other things, the inertia of the air mass flowing into the combustion chambers or of the inflowing mixture. The acceleration of the inert air mass delays the buildup of the torque. The full engine torque is therefore not immediately available after the releasing of the brake and the vehicle does not accelerate optimally.

In the case of turbo-engines, the charging in the stalled condition, as an alternative or in addition, is reduced by a reduction of the charge pressure. This has the disadvantage that the charge pressure first has to rise again after the releasing of the brake. The full engine torque is not available during the time required for this purpose.

It is also known to limit the maximal stalling time, thus the maximal duration of the stalling, in order not to overload the clutch. When the maximal stalling time is exceeded, for example, the signal of the driver's intention indicator can be ignored, so that, in the extreme case, the internal-combustion engine can continue to be operated in the normal idling mode. In order to have greater degrees of freedom when selecting the starting point in time, it is naturally desirable to be able to utilize a maximal stalling time which is as long as possible.

In principle, particularly with respect to sportscars, one wants to achieve a spontaneous and maximal acceleration by stalling. The described protective measures, thus a taking back, or reducing of torques, a slow buildup of torques, long reaction times, low starting powers with a low starting torque and drastic limitations of the stalling time reduce the acceptance and impair the subjectively sensed vehicle handling.

In view of the foregoing, an object of the present invention is to provide a method, a control device, a computer program and/or a storage medium by way of which the diverging demands of a component protection and a maximizing of the acceleration by a preceding stalling can be met in a better fashion.

In a method, this object has been achieved in that the limitation takes place at least partially by way of a controlled reduction of an advance angle efficiency in a first operating condition in comparison to the second operating condition.

Furthermore, the foregoing object has been achieved by a control device which reduces an advance angle efficiency in the first operating condition in comparison to the second operating condition.

With a view to the computer program and the storage medium, the solution has been achieved by programming the computer program for the application of the process, and/or in by storing the computer program on the storage medium.

The advance angle efficiency is the quotient of the torque occurring at a certain advance angle in the numerator and of the maximal torque in the denominator which occurs in the case of an optimal advance angle.

The foregoing object is in each case achieved completely by the following characteristics. The change of the advance angle efficiency can take place from one ignition to the next which, in a six-cylinder four-stroke internal-combustion engine, corresponds to a crankshaft angle of 120°. Within one operating cycle, thus, within an angle-of-rotation range of 720°, all cylinders can be switched over from the reduced advance angle efficiency to an optimal advance angle efficiency, so that in the case of 3,600 rotations per minute, used as an example, the full torque is built up within one thirtieth (1/30) of a second, so as to feel like a sudden buildup in the subjective perception of a human being.

With respect to charge interventions, the torque buildup takes longer because the combustion chambers operated with a reduced charge have to be newly charged in a first operating cycle before the charges can be ignited in a second operating cycle. Furthermore, the inert air mass first has to be accelerated from out of the suction pipe in the direction of the combustion chambers, which results in additional delays.

In turbo-engines, the time required for the torque buildup increases significantly more because exhaust gases of an increased charge reach the turbocharger first and have to increase its rotational turbine speed to achieve a higher charge pressure and therefore a further increase of the charge.

The present invention will therefore maximally exhibit its advantages in the case of engines having an exhaust gas turbocharger if the torque is reduced only by way of ignition interventions. When the brake is released, the full charge pressure will then be present because, in the ideal case, the air mass flow through the internal-combustion engine is not limited during the stalling and the charge pressure is therefore not reduced.

With respect to further developments of the inventive method, the impairment of the advance angle efficiency preferably takes place by reduction of the angular distance between the ignitions and an upper dead center of a piston movement of the internal-combustion engine.

If the advance angle efficiency is placed over the advance angle, a maximum will occur at the optimal advance angle. In principle, a reduction of the torque can therefore be achieved by an early ignition; that is, an ignition (early adjustment) taking place at a larger distance from the upper dead center; or by an ignition (late adjustment) taking place correspondingly closer to the upper dead center. However, in the case of an early adjustment, damage may occur at the spark plugs or at the internal-combustion engine as a result of so-called knocking combustions. The late adjustment has the additional advantage that the exhaust gas temperature rises, which increases the thermodynamic efficiency of the turbine in the case of turbo-engines.

It is also preferred that, in a supplementary manner, the limitation takes place by limiting charges of combustion chambers of the internal-combustion engine.

As a result of this combination, particularly in the case of internal-combustion engines having an exhaust gas turbocharger, a high charge pressure and thus a high starting power can be achieved when the brake is released, because the air mass flow is reduced only as little as required during the stalling. In addition, such a measure may be used for a possibly required limitation of the exhaust gas temperature for protecting components of the exhaust system and for limiting pollutant emissions during the stalling.

Another currently preferred embodiment provides that a torque loss resulting from the reduction of the advance angle efficiency is gradually reduced in the first operating condition, while a torque loss resulting from the limitation of charges is gradually increased in the first operating condition. By this measure, a constant transition can be initiated from an excessively long stalling into an operating condition in which the component protection has to again receive a higher priority than a maximal starting acceleration. When the charge is limited, the exhaust gas temperature, for example, will fall.

As an alternative, a torque loss resulting from the limitation of charges is preferably gradually reduced in the first operating condition, while a torque loss resulting from the reduction of the advance angle efficiency is gradually increased in the first operating condition. As a result, an advance angle torque reserve is gradually built up at the expense of a charge torque reserve, in which case also a rise of the exhaust gas temperature is delayed which is triggered by the late adjustment of the ignition. This reduces the thermal stressing of the components situated in the hot exhaust gas scaled to a certain stalling time and permits a lengthening of the maximally acceptable stalling time.

In this case, it is preferred that, after the expiration of a definable maximal time duration, a change takes place to the other alternative, in order again assign a higher priority to the component protection, if required. The two alternatives can therefore also be combined so that the advance angle torque reserve first increases and, if required, is then reduced again.

It is also preferred that the limitation will take place only if a driving speed of the motor vehicle is lower than a driving speed threshold value. Consequently, the reduction of the torque and of the power remains limited, for example, to the vehicle stoppage or low speeds. The dynamics of the vehicle movement are thereby prevented from being impaired at higher speeds when, for example, a certain roll steer effect of the vehicle is to be caused by a simultaneous braking and accelerating.

Additionally, a limitation of a rotational speed of the internal-combustion engine to a maximal value preferably takes place in the first condition. This measure, on the one hand, limits the power to be converted to heat during the stoppage. Simultaneously, a rotational speed reserve still occurs when the brakes are released, so that the optimal starting acceleration does not have to be interrupted early because of a required ratio transformation in the gear change box.

BRIEF DESCRIPTION OF THE DRAWINGS

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

DETAILED DESCRIPTION OF THE DRAWINGS

Figure 1:
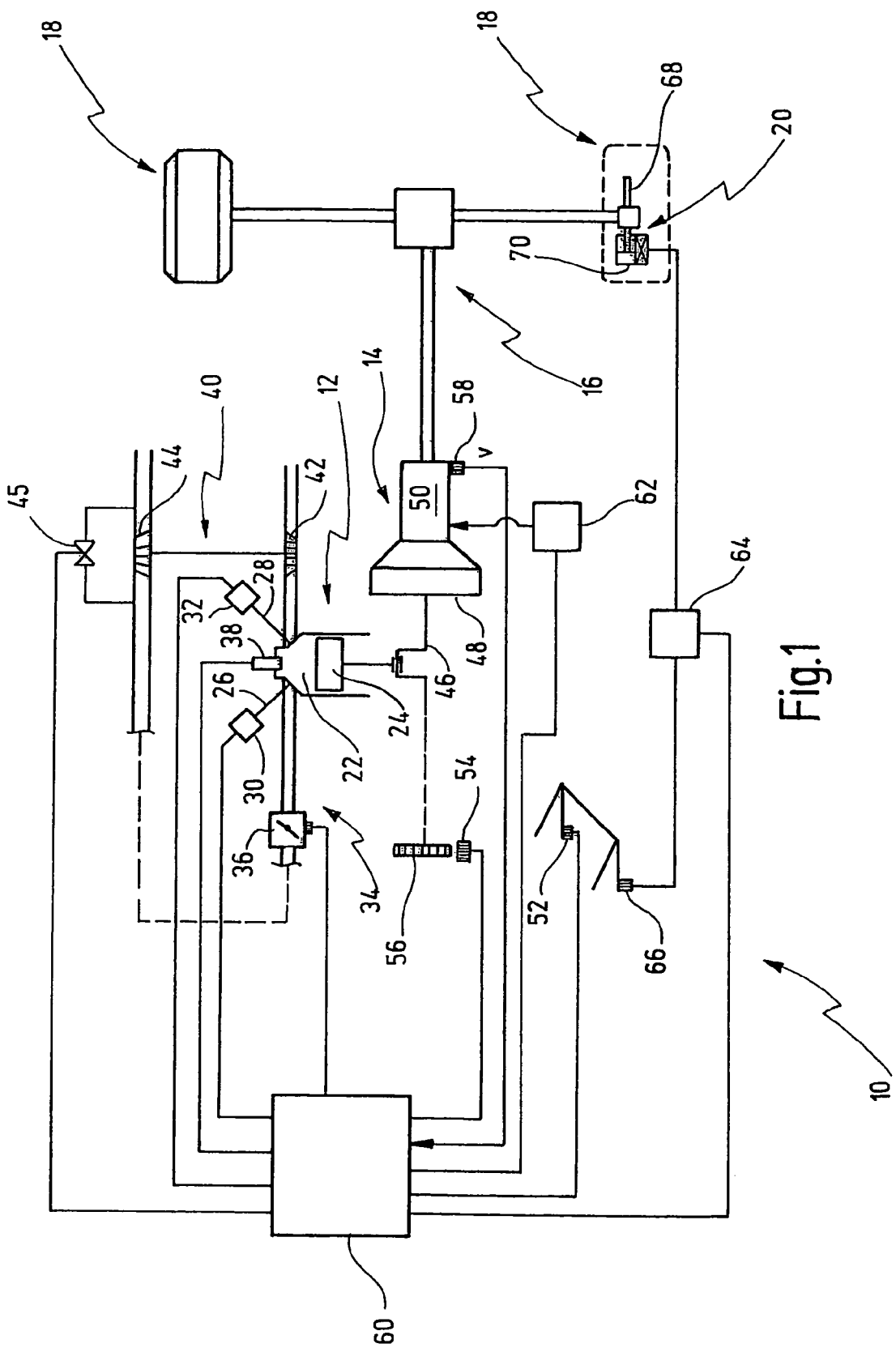
FIG. 1 is a schematic environmental view of the present invention.

FIG. 1 schematically illustrates the drive train designated overall by numeral 10 of a motor vehicle which is driven by an internal-combustion engine designated generally by numeral 12. The torque generated by the internal-combustion engine 12 is transferred to driving wheels 18 of the motor vehicle by way of a torque converter 14 and a power transmission and deflecting mechanism 16. A vehicle brake 20 is integrated in the driving wheels 18.

The torque of the internal-combustion engine 12 is generated in combustion chambers 22 which are movably sealed off by pistons 24. A change of charges of the combustion spaces 22 is controlled by intake valves 26 and exhaust valves 28. The intake valve 26 is operated by an intake valve actuator 30, and the exhaust valve 28 is operated by an exhaust valve actuator 32. The actuators 30, 32 can be implemented as camshafts running at a fixed phase relation, camshafts with a variable phase relation, or as mechanical, hydraulic or electromagnetic actuators which permit a variable lift of the intake valves 26 and outlet valves 28.

When the intake valve 26 is open, air or a mixture of air and fuel flows from an intake system 34 into the combustion chambers 22. The quantity of the inflowing air or of the inflowing mixture is adjusted by way of a throttle valve actuator 36 and/or, when the intake valve actuator 30 is further developed correspondingly, by way of a variable lift of the intake valve 26. The fuel metering takes place either in the intake system 34 (manifold injection) or by a direct injection of fuel into the combustion chambers 22 (direct injection). In each case, a combustible air-fuel mixture is generated in the combustion chambers 22, which is ignited by a spark plug 38 and drives the piston 24. Residual gases of the burnt charge of the combustion chambers 22 are expelled by way of the opened exhaust valve 28.

The internal-combustion engine 12 illustrated in FIG. 1 has an exhaust gas turbocharger 40 whose turbine wheel 42 is driven by the expelled exhaust gases and itself drives a compressor impeller 44 in the intake system 34. By way of a charge pressure control valve 45, the charge thereby generated in front of the throttle valve 36 and/or the intake valve 26 and thereby the charge of the internal-combustion chambers 22 are influenced. Although the invention is described in the technical environment of FIG. 1, thus, of an internal-combustion engine 12 with an exhaust gas turbocharger 40, it should be understood that the present invention can also be used in the case of internal-combustion engines without such an exhaust gas turbocharger 40. In turn, the piston 24 driven by the combustion pressure drives a crankshaft 46 of the internal-combustion engine 12 which is frictionally connected with a torque converter 14.

The torque converter 14 has a clutch 48 as a frictional element as well as a gear change box 50. The clutch 48 can be implemented as a separable dry or wet friction clutch or as a hydraulic torque converter or hydraulic clutch. It is important that, when the transmission input shaft is locked by a braking intervention upon the vehicle brake 20, the clutch 48 can convert a rotating power fed by the crankshaft 46 with as little wear as possible to frictional heat.

The torque generated by the internal-combustion engine 12 is significantly defined by a driver's intention indicator 52 which is connected with an accelerator pedal of the motor vehicle. An angle-of-rotation sensor 54 scans the angle marks of a transmitter wheel 56 non-rotatably connected with the crankshaft 46 and thereby supplies information on the angular position and angular velocity of the crankshaft 46. Optionally, a driving speed indicator 58 is additionally connected to detect, for example, a rotational speed at the output of the gear change box 50.

It is also to be understood that, for controlling and/or regulating a drive train 10 in modern motor vehicles, a plurality of additional sensors may be present which detect the pressures, temperatures, angular positions of camshafts and additional operating parameters of the internal-combustion engine 12 and/or of the drive train 10. The present invention is therefore not limited to a drive train 10 which only has the previously indicated sensors.

For controlling the internal-combustion engine 10, the signals of the driver's intention indicator 52, of the rotational speed sensor 54 and possibly of the driving speed indicator 58 are processed by an engine control device 60 which generates control signals therefrom for controlling functions of the internal-combustion engine. In this context, important control signals are those which influence the torque generated by the internal-combustion engine 12. These are essentially signals which influence a charge of the combustion chambers 22 in a so-called air path, as well as ignition signals for triggering an ignition in the combustion chamber charge by controlling the spark plug 38 at a predetermined angular position of the crankshaft 46.

In the drive train 10 illustrated in FIG. 1, the charge can be influenced, for example, by triggering the charge pressure valve 45, the throttle valve actuator 36 and/or the intake valve actuator 30. The drive train 10 can also be influenced in a supplementary manner by a transmission control device 62 and a brake control device 64, in which the control devices 60, 62, 64 can exchange signals via a bus system, or two or three devices can be combined to a constructional control device unit. The brake control device 64, for example, an ABS control device, processes signals of a brake signal generator 66 which can be connected, for example, with a brake pedal of the motor vehicle. As a function of signals of the brake signal generator 66, the vehicle brake 20 in particular can be locked in that brake disks 68 are locked by an operation of calipers 70. The signal of the brake signal generator 66 is transmitted to the engine control device 60 either directly or by way of the brake control device 64.

Figure 2:
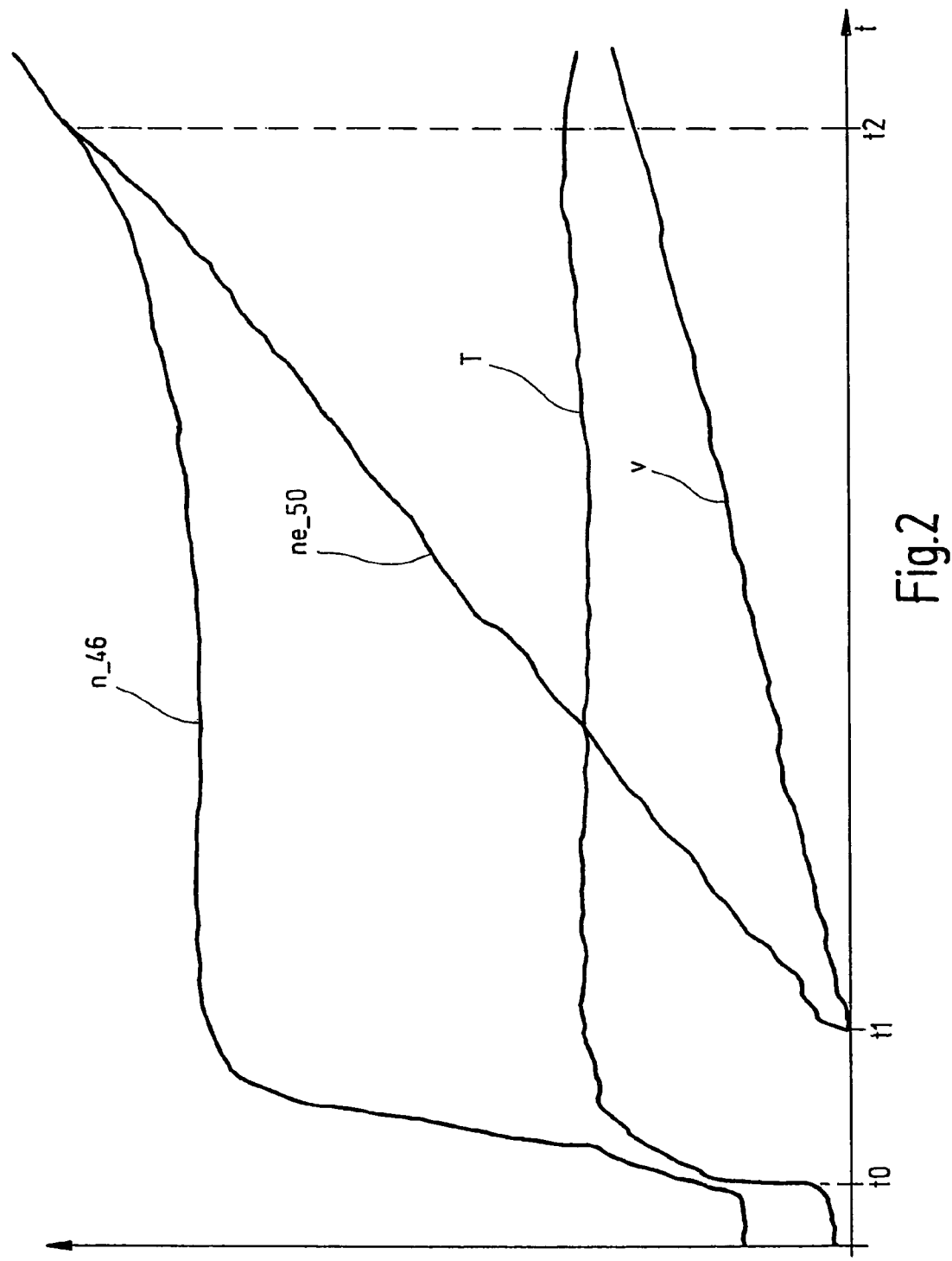
FIG. 2 is a graph showing the course of various parameters from the environment of FIG. 1 during stalling and subsequent vehicle acceleration.

FIG. 2 illustrates a course of various operating parameters of the drive train 10 during stalling and subsequent vehicle acceleration. With respect to details, FIG. 2 shows a rotational crankshaft speed $n\_46$, a rotational speed $ne\_50$ at the input of the gear change box 50, a torque T generated by the internal-combustion engine 12 and a vehicle speed v over the time. Up to the point in time t0, the internal-combustion engine 12 is, for example, idling at low values of rotational crankshaft speed $n\_46$ and of torque T. At the point in time t0, a high torque is demanded by way of the driver's intention indicator 52 and the vehicle brake 20 is simultaneously locked. The rotational crankshaft speed $n\_46$ and the torque T rise to defined maximal values corresponding to the torque demand, so that the vehicle is held in the stopped condition by the vehicle brake 20 possibly at a full torque and at a high rotational speed.

In the case of automatic transmissions with a hydraulic torque converter, the rotational engine stalling speed occurs during stalling. This rotational speed is defined by the configuration of the converter. In transmissions with an automatically operated clutch, the rotational engine stalling speed can be defined by the engine control device 60. The higher the torque T and the rotational speed $n\_46$ during stalling, the higher the power loss in the clutch 48, the frictional work carried out therein and therefore the mechanical and thermal stressing of the clutch 48.

The brake is released at the point in time t1. The vehicle starts to move immediately after releasing the vehicle brake 20, so that the driving speed v increases. In this event, the torque T is increasingly transferred to the gear change box 50 by the clutch 48, so that the rotational input speed $ne\_50$ of the gear change box 50 rises.

The vehicle accelerates at a full torque T and at a full rotational engine speed $n\_46$, in which case the difference of the rotational crankshaft speed $n\_46$ and of the rotational input speed $ne\_50$ of the gear change box 50 is gradually reduced until, at the point in time t2, a frictionally non-rotatable connection is established between the gear change box 50 and the crankshaft 46 of the internal-combustion engine 12.

Figure 3:
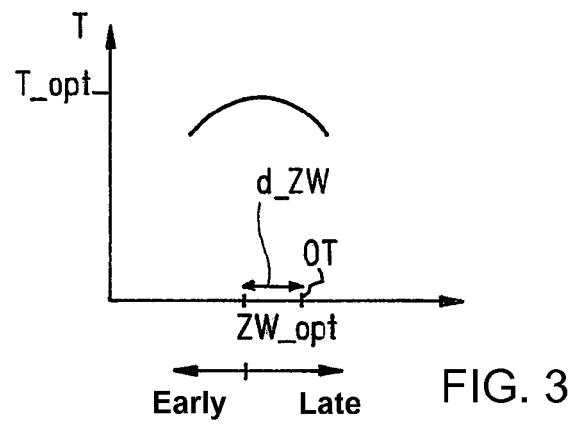
FIG. 3 is a graph showing the relationship between an engine torque and an advance angle.

FIG. 3 qualitatively illustrates the influence of the advance angle on the torque T generated by the internal-combustion engine 12. Accordingly, the torque T is maximal at an optimal advance angle ZW_opt and, when the advance angle is adjusted, decreases in the late direction (spät) or in the early direction (früh). The above-defined advance angle efficiency changes correspondingly. As a rule, the optimal advance angle ZW_opt is situated at a distance d_ZW in front of the upper dead center OT at the end of a compression cycle of the piston 24.

Figure 4:
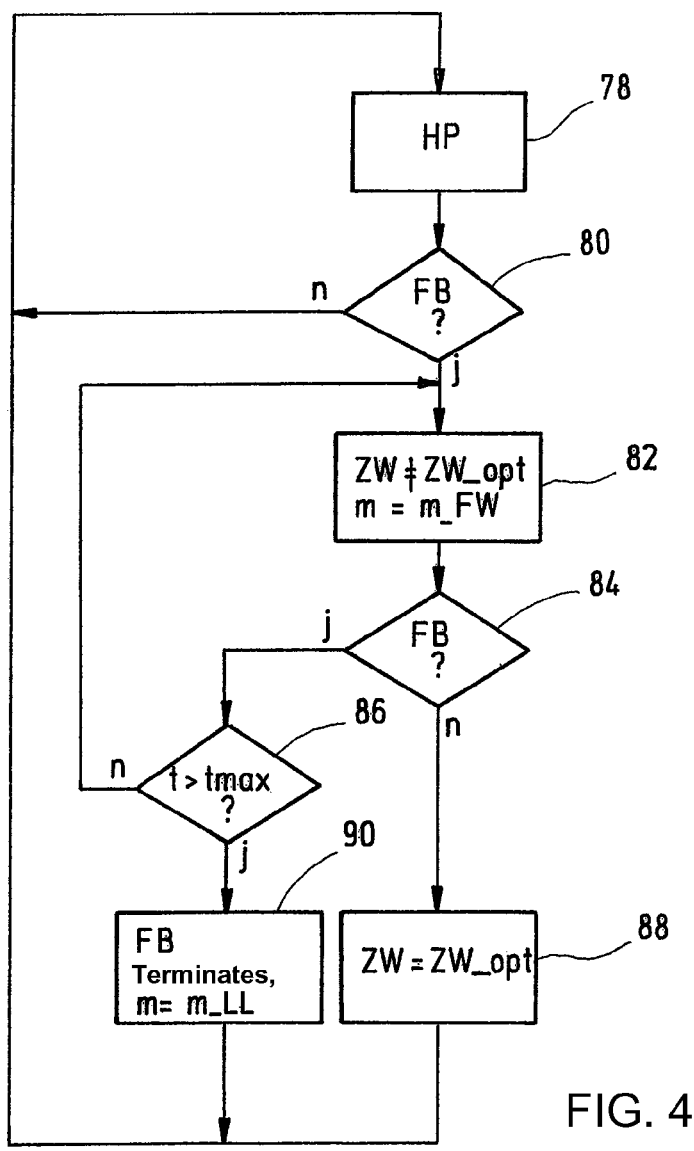
FIG. 4 is a flow chart of a first embodiment of a method according to the invention.

FIG. 4 is a flowchart illustrating a first embodiment of a method according to the invention. Accordingly, from a main program HP for controlling the internal-combustion engine 12 (Step 78) and in which, for example, idling values of the internal-combustion engine 12 can be set, such as a charging of the combustion chambers 22 with an air mass m_LL and a rotational idling speed, Step 80 is reached to check whether any stalling conditions FB have been met. The answer to the query in Step 80 will be "yes" particularly if the brake signal generator indicates an operated vehicle brake 20 and simultaneously the driver's intention indicator 52 indicates a high torque demand. In this case, in which the drive train 10 is to be distorted corresponding to the courses of the signals n_46 and T in the time period between times t0 and t1 of FIG. 2, the process branches to Step 82 in which the charging of the internal-combustion chambers 22 is increased, in which case the torque of the internal-combustion engine 12 is simultaneously limited by the setting of an advance angle ZW which deviates from the optimum advance angle ZW_opt. The increase of the charge is represented in Step 82 in that a charge corresponding to the change of the driver after a high torque represents m_FW.

With these steps, which may also be supplemented by steps for limiting the rotational engine speed n_46, the rise of the torque T and of the rotational engine speed n_46 occurs which is illustrated in FIG. 2 between the times t0 and t1. It is then checked in Step 84 whether the conditions for vehicle stalling continue to exist. If the answer to this query is in the affirmative, the process branches to Step 86 which examines whether a time t has exceeded a maximally permissible time tmax. This maximally permissible time tmax is defined by the engine control device 60, for example, at the start of a stalling phase in order to prevent damage to the clutch 48. If the query in Step 86 is answered in the negative, Step 82 is reached again, in which the advance angle adjustment and the increases charges of the internal-combustion spaces 22 continue to be maintained.

The passing through the loop consisting of Steps 82, 84 and 86 takes place until one of the termination conditions queried in Steps 84 and 86 has been met. If, for example, the maximally permissible time tmax is exceeded, the process branches from Step 86 to a Step 90, in which the stalling is terminated. For this purpose, particularly the increase of the charge of the combustion chambers 22 is canceled and a branching takes place back into the main program 78, in which, for example, a normal idling condition of the internal-combustion engine 12 is set. In this case, particularly the increased charge m_FW is reduced to an idling value m_LL.

If, in contrast, the vehicle brake 20 is released within the permissible stalling time span, this is determined in Step 84 because then the stalling conditions FB are no longer met. In this event, the process branches from Step 84 to Step 88 in which the reduction of the advance angle efficiency is canceled by the sudden adjusting of the advance angle to the optimal advance angle ZW_opt. As a result, the torque reserve of the internal-combustion engine, which is provided because of the connection of the adjusted ignition and the increased charge of the combustion chambers 22, is abruptly mobilized so that, at the point in time t1 in FIG. 2, the vehicle can be accelerated by way of maximally permitted values of the stalling torque T.

Figure 5:
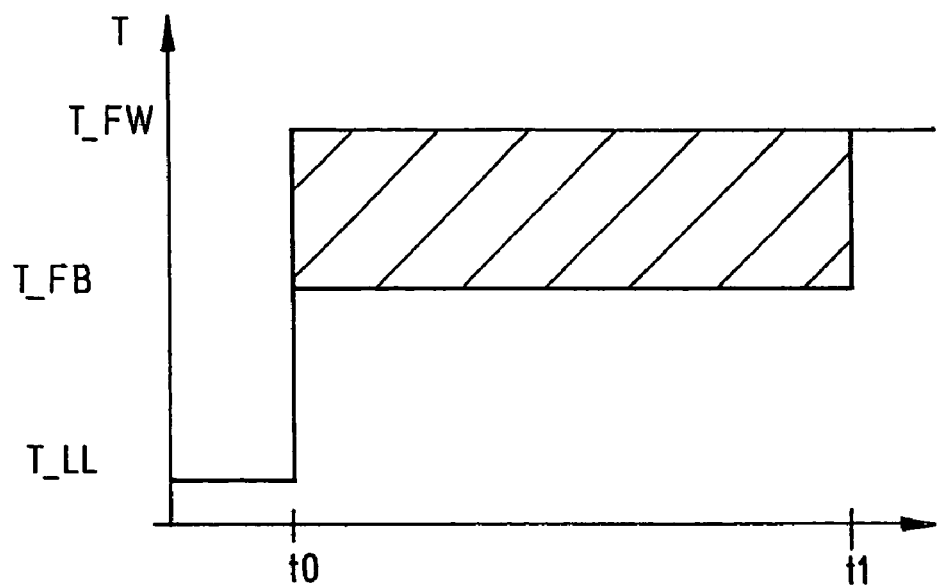
FIG. 5 is a graph showing the buildup of a torque reserve as a result of charge and ignition interventions.

FIG. 5 qualitatively illustrates the course of the torque T of the internal-combustion engine 12 between points in time t0 and t1 of FIG. 2. Up to the point in time t0, the internal-combustion engine 12 is idling, at which time an idling torque T_LL occurs. At the point in time t0, the driver's intention indicator 52 demands a high torque T_FW. Since the vehicle brake 20 simultaneously locks the drive train 10, however, the torque T of the internal-combustion engine 12 is not increased to the desired value T_FW but, by way of the process illustrated in FIG. 4, is limited to a maximal value T_FB permissible for the stalling. Not before the point in time t1 will the limiting measure be canceled, so that the torque actually generated by the internal-combustion engine 12 corresponds to the desired value T_FW defined by the driver's intention. The hatched surface in FIG. 5 therefore, as it were, represents a torque reserve which is provided at the point in time t0 and is mobilized at the point in time t1.

In the process illustrated in FIG. 4, the providing of this torque reserve takes place by the charge of the combustion chambers 22 being adjusted corresponding to the driver's intention and the then expected torque T_FW being limited to the maximally permissible value T_FB by an advance angle intervention. In the state of the art prior to the present invention, in contrast, the maximally permissible value T_FB was set in that the charge of the combustion chambers 22 was already limited to a value which, at an optimal advance angle, led to the T_FB value.

In other embodiments of the invention, mixed forms of the two limiting measures are also contemplated. In those cases, particularly the advance angle ZW value and the charge m value can be set in Step 82 as a function of the time. Here, the advance angle is set corresponding to the following equation:

$$ZW = ZW\_opt + d\_ZW(t).$$

Correspondingly, the charge m is set as follows:

$$m = m\_FW - dm(t).$$

In other words, the ignition is adjusted in the "late" direction and the charge m is reduced. In this case, the d_ZW(t) and dm(t) values are to be adjusted, for example, such that the resulting torque T_FB between the points in time t0 and t1 of FIG. 2 remains constant. This takes place, for example, when a late adjustment of the advance angle ZW by the amount d_ZW(t) leads to a loss of torque −T_ZW; a reduction of the charge by the value dm(t) leads to a decrease of the torque by a value −T_dm, so that the following equation is met:

$$T\_FB = T\_FW - T\_dm - T\_ZW$$

In this case, the time slope of the interventions d_ZW(t) and −dm(t) reducing the torque can be such that, at the start of the stalling phase, a large air path adjustment −dm(t) is combined with a small ignition adjustment +d_ZW(t), the advance angle intervention d_ZW(t) being enlarged as the stalling time increases, and the charge intervention −dm(t) being reduced as the stalling time increases.

As an alternative, a large ignition adjustment d_ZW(t) can be selected at the start of the stalling phase. The ignition adjustment d_ZW(t) is reduced as the stalling time increases, while an initially slight charge intervention −dm(t) is enlarged as the stalling time increases.

Figure 6:
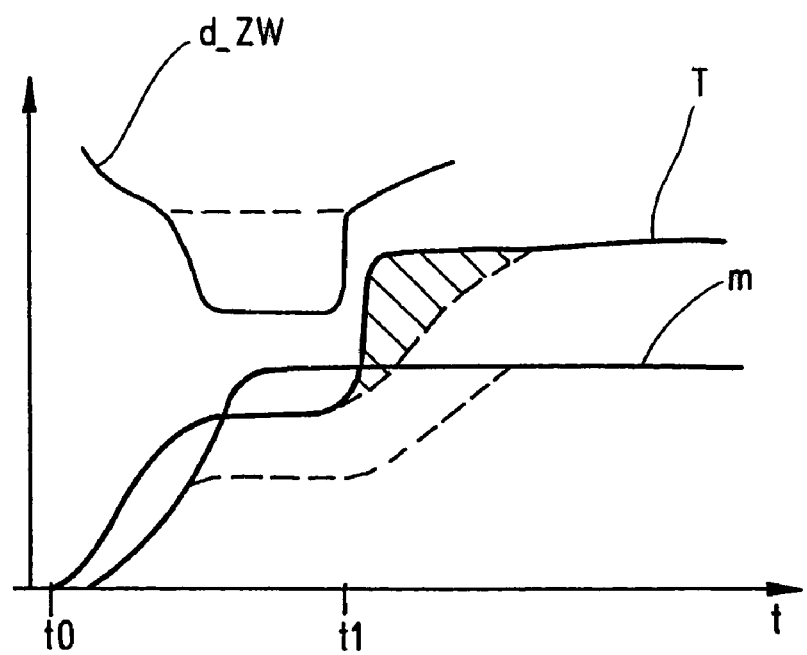
FIG. 6 is a graph showing the courses of various signals from the environment of FIG. 1 and thereby illustrating advantages of the present invention.

FIG. 6 illustrates the advantages of the invention by comparing the time slopes of the torque T of the internal-combustion engine 12, the charge m of its combustion chambers 22 and the distance d_ZW of the advance angle from the upper dead center OT. The broken curves represent the prior art and the solid curves occur in a further development of the inventive method disclosed here. As illustrated by the course of the charge m, previously the charge m of the combustion chambers 22, in comparison, was considerably reduced (broken line) which, after the release of the vehicle brake 20 at the point in time t1, resulted in a comparatively slow rise of the torque T actually provided by the internal-combustion engine 12. As a result of the comparatively large reduction of the charge m, the advance angle was not changed in the prior art which corresponds to be broken course of the curve marked d_ZW.

Because of the fact that, in the processes introduced here, a comparatively large late adjustment of the ignition takes place between the points in time t0 and t1 during stalling, which is exhibited in the curve marked d_ZW by way of the pronounced minimum between t0 and t1, the charge m can be increased considerably already during the stalling phase between the points in time t0 and t1. The thereby built-up advance angle torque reserve can be suddenly mobilized by eliminating the late adjustment of the ignition, so that the torque T rises significantly faster in the processes introduced here than in the prior art approach. The hatched area in FIG. 6 illustrates the torque gain achieved with the methods disclosed herein.

While we have shown and described one or more embodiments in accordance with the present invention, it is to be clearly understood that the present invention contemplate further changes and modifications without departing from its spirit. Therefore, we do not intend to be limited by the foregoing description but intend to cover all such changes and modifications falling witness the scope of the appended claims.

What is claimed is:

1. A method of limiting, in a first operating condition, a motor vehicle internal-combustion engine torque, comprising establishing the first operating condition as a result of a brake operation when the torque is simultaneously demanded by a driver's intention indicator, said first operating condition differing from a second operating condition in which the brake is not operated, and limiting the torque at least partially by a controlled reduction of an advance angle efficiency in the first operating condition in comparison to the second operating condition, the limiting also taking place by limitation of charges of internal-combustion engine combustion chambers.

2. The method according to claim 1, wherein reduction of the advance angle efficiency takes place by reduction of an angular distance between ignitions and an upper dead center of an internal-combustion engine piston movement.

3. The method according to claim 1, wherein reduction of the advance angle efficiency takes place by a reduction of an angular distance between ignitions and an upper dead center of an internal-combustion engine piston movement.

4. The method according to claim 1, wherein a torque loss resulting from the reduction of the advance angle efficiency is gradually reduced in the first operating condition, while a torque loss resulting from the limitation of charges is gradually increased in the first operating condition.

5. The method according to claim 1, wherein a torque loss resulting from the limitation of charges is gradually reduced in the first operating condition, while a torque loss resulting from the reduction of the advance angle efficiency is gradually increased in the first operating condition.

6. The method according to claim 5, wherein, after the expiration of a definable maximal time duration, the torque loss resulting from the reduction of the advance angle efficiency is gradually reduced in the first operating condition while the torque loss resulting from the limitation of charges is gradually increased in the first operating condition.

7. The method according to claim 1, wherein the limiting takes place only when a motor vehicle driving speed is lower than a driving speed threshold value.

8. The method according to claim 1, wherein limitation of an internal combustion engine rotational speed to a maximal value also occurs in the first operating condition.

9. A motor vehicle internal-combustion engine control device, comprising means for, in a first operating condition, limiting internal-combustion engine torque, said first operating condition, as a result of an operation of a brake when the torque is simultaneously demanded by a driver's intention indicator, differing from a second operating condition in which the brake is not operated, the limiting also taking place by limitation of charges of internal-combustion engine combustion chambers, and means for reducing an advance angle efficiency in the first operating condition in comparison to the second operating condition.

10. The control device according to claim 9, wherein reduction of the advance angle efficiency takes place by reduction of an angular distance between ignitions and an upper dead center of an internal-combustion engine piston movement.

11. The control device according to claim 9, wherein a torque loss resulting from the reduction of the advance angle efficiency is gradually reduced in the first operating condition, while a torque loss resulting from the limitation of charges is gradually increased in the first operating condition.

12. The control device according to claim 9, wherein a torque loss resulting from the limitation of charges is gradually reduced in the first operating condition, while a torque loss resulting from the reduction of the advance angle efficiency is gradually increased in the first operating condition.

13. The control device according to claim 12, wherein, after the expiration of a definable maximal time duration, said torque loss resulting from the reduction of the advance angle efficiency is gradually reduced in the first operating condition, while said torque loss resulting from the limitation of charges is gradually increased in the first operating condition.

14. The control device according to claim 9, wherein the limiting takes place only when a motor vehicle driving speed is lower than a driving speed threshold value.

15. The control device according to claim 9, wherein a limitation of an internal-combustion engine rotational speed to a maximal value also occurs in the first operating condition.

* * * * *